United States Patent

Proctor et al.

[11] Patent Number: 5,898,696
[45] Date of Patent: Apr. 27, 1999

[54] METHOD AND SYSTEM FOR CONTROLLING AN ENCODING RATE IN A VARIABLE RATE COMMUNICATION SYSTEM

[75] Inventors: Lee Michael Proctor, Cary; James Patrick Ashley, Naperville, both of Ill.

[73] Assignee: Motorola, Inc., Schaumburg, Ill.

[21] Appl. No.: 08/924,602

[22] Filed: Sep. 5, 1997

[51] Int. Cl.[6] ............................................. H04J 3/16
[52] U.S. Cl. ..................... 370/468; 370/342; 370/479; 370/441
[58] Field of Search ................................. 370/252, 260, 370/342, 441, 468, 479; 704/206, 207, 208, 221, 222, 223, 231

[56] References Cited

U.S. PATENT DOCUMENTS

| | | | |
|---|---|---|---|
| 4,317,195 | 2/1982 | Barberis et al. | 370/412 |
| 5,363,404 | 11/1994 | Kotzin et al. | 375/206 |
| 5,440,542 | 8/1995 | Proctor et al. | 370/335 |
| 5,519,779 | 5/1996 | Proctor et al. | 370/342 |
| 5,570,363 | 10/1996 | Holm | 370/260 |
| 5,657,420 | 8/1997 | Jacobs et al. | 704/222 |
| 5,703,902 | 12/1997 | Ziv et al. | 370/252 |

*Primary Examiner*—Douglas W. Olms
*Assistant Examiner*—Shick Hom
*Attorney, Agent, or Firm*—Sayed Hossain Beladi

[57] ABSTRACT

A method and system for controlling an encoding rate in a communication system utilizes feedforward rate information (48) and/or rate desirability information (50) sent from each of a plurality of variable rate vocoders (34) to a communication link output controller (24), such as a network arbitor. The communication link output controller (24) then sends a feedback control signal (32) to a selected variable rate vocoder to change the encoding rate of the selected variable rate vocoder to facilitate re-encoding of the speech packet when a bottleneck is detected. In another embodiment, the network arbitor (134) may additionally and independently modify speech packet data when it determines that a bottleneck may occur. The network arbitor (134) also communicates a packet modification control signal (132) for the variable rate vocoder that generated the dropped packet so that the corresponding variable rate vocoder can adjust its filter states to maintain convergence.

32 Claims, 7 Drawing Sheets

METHOD AND SYSTEM FOR CONTROLLING AN ENCODING RATE IN A VARIABLE RATE COMMUNICATION SYSTEM

RELATED APPLICATIONS

The instant application is related to a co-pending application entitled "Method And System For Controlling Speech Encoding In A Communication System" having Ser. No. 08/926,074, the same inventors, assigned to the same assignee and filed on the same date.

FIELD OF THE INVENTION

The invention relates generally to communication systems having improved data throughput over a limited bandwidth link and more particularly to methods and systems for controlling an encoding rate in a variable rate communication system.

BACKGROUND OF THE INVENTION

One of the main aims of packet networks and frame relay systems is to maximize the data throughput of a system given a limited bandwidth communication link. In the case of speech information, conventional code division multiple access (CDMA) cellular systems take advantage of the statistical nature of speech to increase the number of channels handled by a given data "pipe". This is particularly the case with CDMA systems where speech coding algorithms in voice coders (vocoders) generate variable speech packet sizes that are directly related to the amount of speech activity at a given time.

As the number of channels is increased, there is an increased occurrence of packet blocking where the data rate of the link is exceeded by the short-term requirements of the speech (voice) packets. Therefore, the number of channels is typically set at a level where these collisions occur at a statistically low level. When such collisions do occur, speech packets are typically thrown away or bits within a speech packet have to be thrown away to reduce the packet size. This inevitably results in reduced voice quality due mainly to a loss of relevant speech information and to a subsequent divergence of the voice encoder's filter state to the voice decoder's filter state. For example, where a base site controller (BSC) encodes speech in its transcoder as received from a mobile switching center, a mobile subscriber unit receiving the voice has a decoder filter whose states should be similar to the state of the encoding filter to maintain a proper historical record for use by the filters to properly encode and decode voice signals. Where the filter states differ between an encoder and the corresponding decoder, a loss in voice quality can occur over time.

In a conventional code division multiple access cellular radio telephone system, the conventional limited bandwidth communication link which passes the transcoded information is a T1 Megastream link, which, assuming a data traffic transfer rate of 16 kilobits/sec, yields 96 channels. Also in conventional CDMA cellular radiotelephone systems, a centralized base site controller uses the transcoder to transform data at a higher rate into data at a lower rate (and subsequently smaller bandwidth). The lower rate data is called transcoded, or rate adapted data. The data is typically coded in traffic channel packets and are communicated to and from a network arbitor which arbitrates among the traffic channels to select which packets are communicated at which time sequences and at which frequency. A network arbitor interfaces with a network interface to communicate the information coming from the transcoder to a base station. The base station then transmits and receives radio signals with a mobile subscriber unit. However, the network arbitor does not typically communicate back to the variable rate vocoders to vary encoding rates or inform the variable rate vocoder that speech packets were dropped to avoid bandwidth bottlenecks.

Forms of increasing system capacity by reducing speech encoder rates-are known. For example, U.S. patent application Ser. No. 08/575,450 filed Dec. 20,1995 entitled "Method and Apparatus for Controlling Encoding Rate in a Communication System" assigned to the instant assignee, proposes a system that identifies specific mobile subscriber units as candidates for encoding rate reduction based on link related characteristics from a group of mobile subscriber units. The link related characteristics, include for example the handoff state of the mobile, the location of the mobile with respect to a serving base station or adjacent base stations, transmission characteristics of the mobile and the amount of noise experienced by the mobile. However, the network arbitor in such a system also does not typically communicate back to the variable rate vocoders to vary encoding rates or inform the variable rate vocoder that speech packets were dropped to avoid bandwidth bottlenecks.

Consequently, a need exists for an apparatus and method which facilitates a maximization of the available bandwidth over a communication link while also maintaining a suitable voice quality level during high capacity link usage. It would be advantageous if such a system could selectively control the variable rate vocoders to change their encoding rate when a required bandwidth exceeded an available bandwidth.

DETAILED DESCRIPTION OF A PREFERRED EMBODIMENT

One embodiment of the disclosed invention utilizes variable rate vocoder related information, such as encoding rate information, sent from each of a plurality of variable rate vocoders, such as variable rate vocoders in a transcoder stage of a base site controller, to a communication link output controller, such as a network arbitor. The communication link output controller then sends a feedback signal to a selected variable rate vocoder to change the encoding rate of the selected variable rate vocoder. The variable rate vocoder related information includes for example rate information and rate desirability information so that the network arbitor can determine a required rate of channel packets that must be communicated over the limited bandwidth communication link. The rate information may be feedforward projected rate data from the variable rate vocoder to the network arbitor.

The network arbitor then compares the required rate to the available rate of the link to determine whether or not a bottleneck will occur. If the network arbitor determines that a bottleneck will occur, a vocoder control signal is generated and sent back to a selected variable rate vocoder to notify the variable rate vocoder to decrease its encoding rate on the current packet so that when encoding is completed the packet will be encoded at a lower rate than initially determined. In this way, the network arbitor generates the vocoder rate control signal to facilitate selective control of the variable rate vocoder prior to the variable rate vocoder completing encoding of a current packet to vary an encoding rate of the current packet prior to the encoding process being completed.

In another embodiment, the network arbitor may additionally and independently modify speech packet data when it determines that a bottleneck may occur. However, in contrast with conventional systems, the network arbitor also communicates to the variable rate vocoder that generated the dropped packet, that the packet was dropped. Consequently, the corresponding variable rate vocoder can adjust its filter states accordingly to reduce divergence so that the encoder and decoder filters converge to improve voice quality over time.

Figure 1:
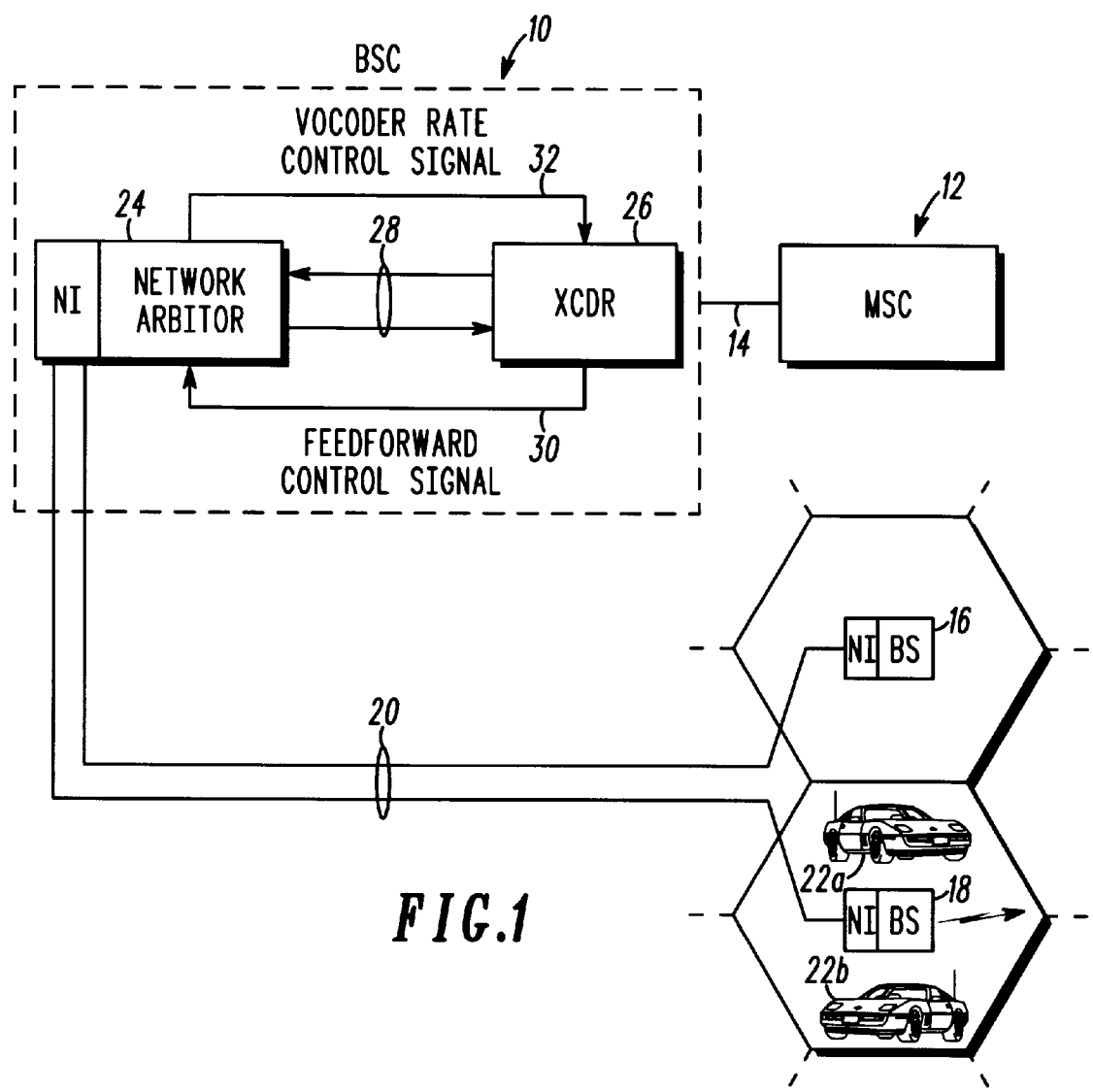
FIG. 1 generally depicts an example of a communication system, such as a cellular radiotelephone system, having a system for controlling an encoding rate in accordance with one embodiment of the invention.

FIG. 1 shows a base site controller 10 in communication with a mobile service switching center (MSC) 12 through limited bandwidth link 14. In the preferred embodiment, the communication system is a code division multiple access (CDMA) cellular radiotelephone system. However, it will be recognized by those of ordinary skill in the art that any suitable communication system may utilize the invention, including other audio communication systems. The mobile service's switching center 12 communicates with a public switch telephone network (not shown). The BSC 10 performs switching functions similar to the MSC 12 but at a location remote with respect to the MSC 12. Base stations 16 and 18 communicate to the BSC 10 through limited bandwidth link 20. The base stations 16 and 18 are capable of communicating with a plurality of mobile stations 22a and 22b.

The base station controller 10 includes a network arbitor 24 in communication with a transcoder 26 for communicating speech packet information 28. The network arbitor 24 receives feedforward data signals 30 over a bus from transcoder 26. The network arbitor 24 determines a required linked bandwidth for transmission of encoded packets of speech based on the feedforward data 30. The network arbitor 24 compares the required link bandwidth with an available link bandwidth to determine the amount of remaining bandwidth for the link. In response, the network arbitor 24 generates a vocoder rate control signal 32 when the required bandwidth exceeds the available bandwidth. The receiving variable rate vocoder controls the encoding rate to facilitate a reduction in bandwidth requirement for the link. Hence the network arbitor 24 selectively controls the encoding rate of at least one variable rate vocoder from the transcoder 26 to facilitate a reduction in required link bandwidth. In this way the BSC 10 utilizes feedforward control data from the transcoder 26 to the network arbitor 24 and in addition incorporates a feedback vocoder rate control signal 32 generated by the network arbitor 24 to selectively control one or more speech encoders to reduce an encoding rate prior to the speech packet of that encoder being transmitted by the network arbitor 24.

Figure 2:
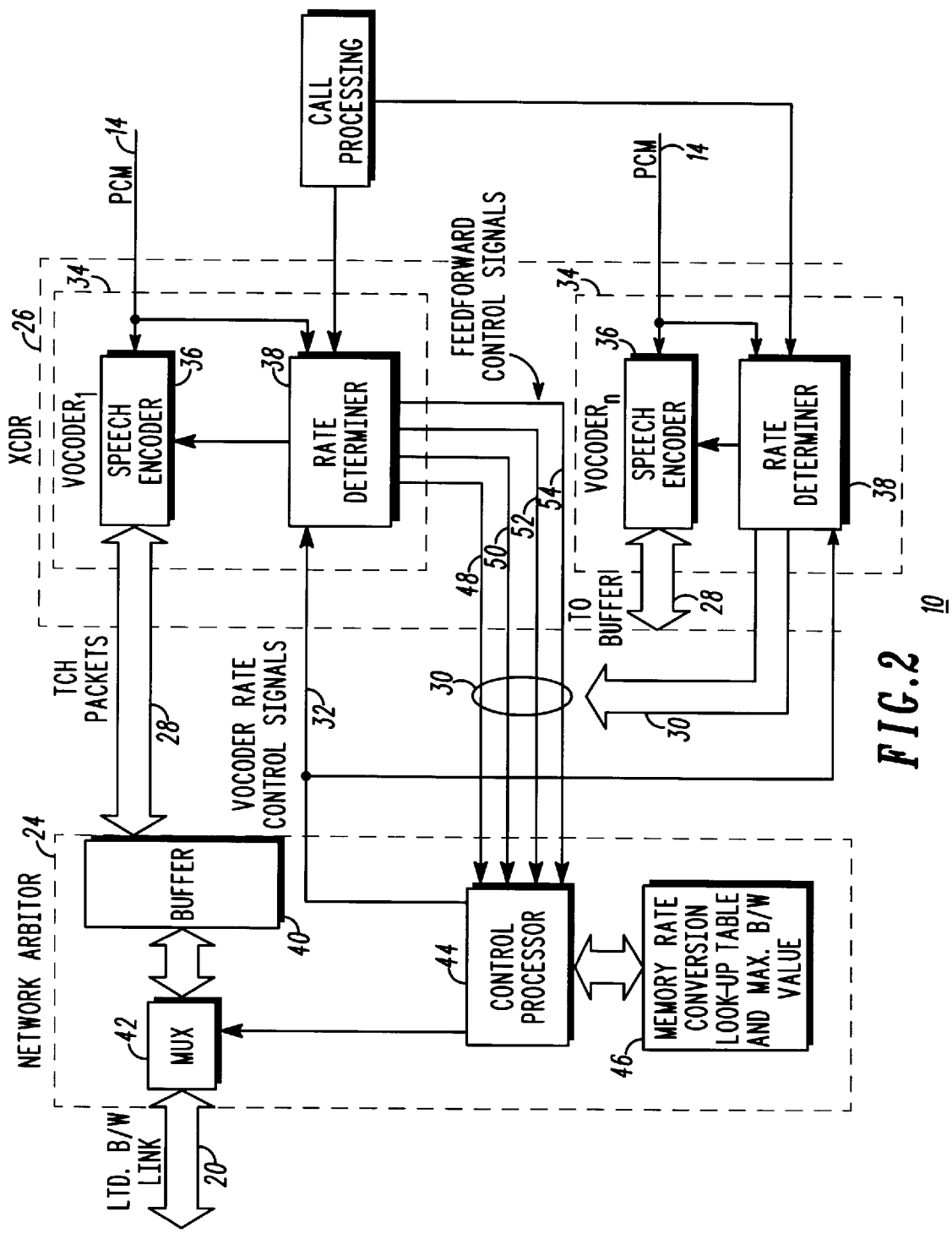
FIG. 2 generally depicts a block diagram of a system for controlling an encoding rate in accordance with one embodiment of the invention.

FIG. 2 shows BSC 10 with the transcoder 26 having a number of variable rate vocoders 34 each with a conventional speech encoder 36 and with a rate determinator stage 38. The speech encoder 36 as known in the art, encodes received speech information 14 and generates and receives traffic channel packets 28. Speech encoders 36 are variable rate encoders. A call processing block sends call signaling control data to the rate determinator stage 38. The call processing block as known in the art, generates among other things, call set up, call tear down commands and power control information. This data is typically multiplexed with encoded speech information and is critical to facilitate proper communication with a mobile unit 22a or 22b.

The network arbitor 24 receives the traffic channel packets 28 in buffer 40. The traffic channel packets 28 are then either transmitted over the limited bandwidth link 20 or received from the limited bandwidth 20 under control of multiplexer 42. The network arbitor 24 also includes a control processor 44 for controlling the multiplexer 42 and for generating the vocoder rate control signal 32 and transmitting the vocoder rate control signal 32 back to each of the variable rate vocoders 34. The network arbitor 24 also has access to memory 46 which may be a database or other suitable memory.

Referring back to rate determinator 38 and variable rate vocoder 34, as with typical rate determinator stages in vocoders, the received voice information is analyzed to determine the rate at which the speech should be encoded by speech encoder 36. However, unlike conventional systems, this rate data is also sent to the network arbitor 24. This rate information is referred to herein as projected rate data 48. The variable rate vocoder 34 through rate determinator 38 transmits the projected rate data 48 to the network arbitor 24 for use by the control processor 44. Preferably, the rate determinator 38 determines the projected speech encoding rate prior to the speech encoder completing the speech encoding process for a given packet. In this way, control processor 44 has ample time to evaluate the projected rate data 48 from each of the vocoders to determine the required bandwidth.

In operation, once the required bandwidth is determined to exceed the available bandwidth, the control processor 44 generates the vocoder rate control signal 32 to selectively control a particular variable rate vocoder. The vocoder rate control signal 32 informs the associated rate determinator 38 to reduce the rate for the particular speech encoder 36 so that the speech encoder 36 can re-encode the same packet prior to transmitting the current speech packet to the network arbitor 24. Hence, the network arbitor 24 receives information from several vocoders and predicts the near-term data rate requirements and compares these requirements to the available or designated link capacity. Each variable rate speech encoder 36 determines their encoding rate early on in the speech encoding process. In response to the vocoder rate control signal, the selected vocoder analyzes a current state of encoding to determine whether re-encoding at a lower encoding rate for a current packet may be suitably accomplished. Moreover higher data rates typically take considerably more processing time to complete before a frame is available. Therefore, the control processor 44 is allowed time to determine which of the vocoders is likely to afford a greater bandwidth reduction benefit by having its encoding rate decreased to maximize the amount of change in bandwidth.

Preferably the control processor 14 determines the available bandwidth by storing a maximum bandwidth value in a lookup table in memory 46. The projected rate data 48 preferably includes vocoder identification bits indicating which vocoder is sending the information and also includes bits representing the projected rate for that particular vocoder. The memory 46 also includes a rate conversion lookup table so that the control processor 44 may cross reference the received projected rate information and determine the number of bits required for transmission. Other suitable command and data techniques may also be used so that a rate conversion table may not be needed. For example, the rate determinator 38 may perform the conversion automatically and send a bit stream indicating the number speech sample bits that are being encoded.

If desired, rate data from the variable rate vocoders may not be sent as feedforward projected rate data, but may be rate data sent contemporaneously as part of a completely encoded traffic channel speech packet 28. In other words, the variable rate vocoders may send encoding rate data as part of the traffic channel packets. In this case, the encoding process is complete for the speech packet and the network arbitor 24 generates the vocoder rate control signal 32 to a selected vocoder to inform the selected vocoder to reduce the rate on a subsequent speech packet from that vocoder. In this way, the network arbitor generates the vocoder rate control signal to facilitate selective control of the vocoder after the vocoder has completed encoding of a packet to vary an encoding rate of a subsequent packet.

In another embodiment, feedforward data 30 may in addition include rate confidence level data 50 which represents a level of confidence that the projected rate data 48 is indicative of a necessary vocoder rate for a given speech packet. The network arbitor 24 receives the rate confidence data 50 from each of the variable rate vocoders 34. Having received projected rate data 48 from all of the vocoders and the rate confidence data 50 from all of the vocoders, the network arbitor selectively controls the vocoder with a lower confidence level and causes that vocoder to decrease its encoding rate. This method provides an improved probability that the vocoder whose rate is being modified is not encoding strong speech signal information. In this way improved voice quality can be maintained with minimized degradation to channels that require a higher encoding rate.

The confidence level data 50 represents how definite the vocoder rate determinator 38 is about the rate decision. The confidence level data 50 preferably ranges from no choice to a borderline condition. For example, the rate determinator 38 may base its estimation on the background noise level as compared to three variable thresholds wherein the three thresholds indicate whether to encode at full rate, half rate, quarter rate or eighth rate. In this arrangement, the confidence level data is based upon the difference between the background noise level and the selected rates lower threshold. For example, in standard IS96A, the rate determinator determines the encoding rate on an estimate of the background noise level Bi that is compared to three variable thresholds (T1, T2 and T3) as shown below:

T3=Full encoding rate

T2=Half encoding rate

T1=Quarter encoding rate under T1=eighth rate.

As such, if the value of Bi exceeds the threshold T3, the encoding rate is set at full rate. If T1 is exceeded but not T2, the encoding rate is set at quarter rate and so on. Hence for IS96A, a confidence level value (CLV) would be based upon the difference between Bi and the selected rate's lower threshold as follows:

CLV(full rate)=function of (Bi-T3)

CLV(half rate)=function of (Bi-T2)

CLV(quarter rate)=function of (Bi-T1)

CLV(eighth rate)=function of (Bi)

The confidence level is also preferably based on the type of data in a speech packet. For example, if the speech packet includes signaling data from the call processing stages, preferably the rate of the signaling information should not be reduced from a full encoding rate because of the risk of losing the data during transmission from the network arbitor. Consequently, the vocoder assigns a high confidence level to this speech packet. It will be recognized that other confidence level criteria may also be used.

In yet another embodiment, the variable rate vocoder 34 through rate determinator 38, generates and transmits projected arrival time data 52 of a speech packet to facilitate a reduction in bandwidth requirement for the link. The projected arrival time data 52 assists the control processor 44 in determining when the traffic channel packet 28 (encoded) will actually be available for transmission from the buffer 40. This information facilitates in determining the time remaining before encoding is complete. It will be recognized that the projected arrival time data 52 may not be necessary if the control processor 44 of the network arbitor of 24 can calculate or knows the amount of time necessary to complete encoding of a speech packet for a particular variable rate vocoder.

In another embodiment, the feedforward data 30 may include signaling packet data 54 as received by network arbitor 24 from variable rate vocoder 34. The signaling packet data 54 represents a start time of synchronous speech packet transmission from the variable rate vocoder to the network arbitor in a synchronous communication system. It will be recognized however that such signaling packet data may not be necessary in an asynchronous communication system between the network arbitor and transcoder.

Figure 3:
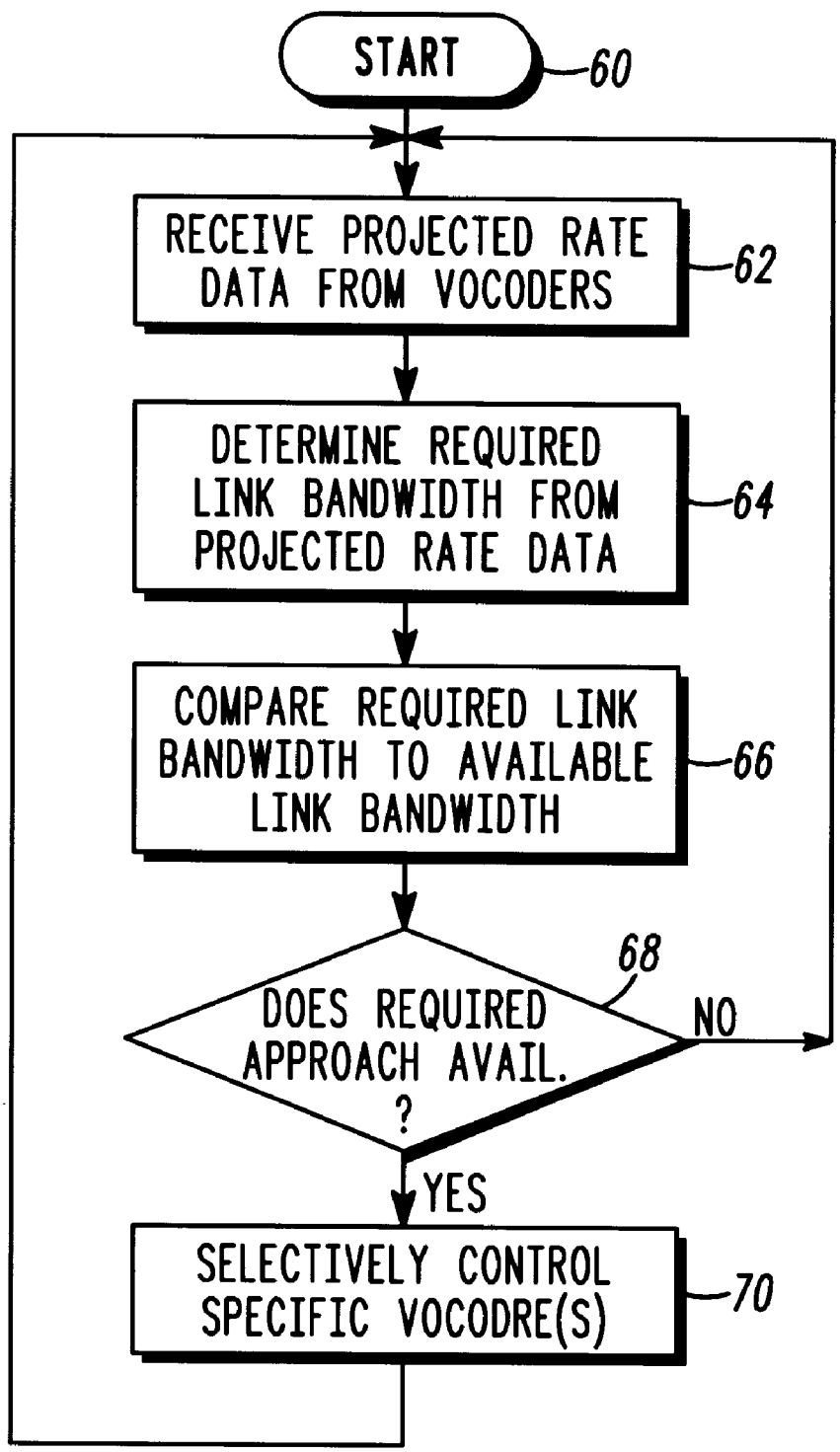
FIG. 3 is a flowchart generally depicting a method of controlling an encoding rate in accordance with one embodiment of the invention.

As shown in FIG. 3, the network arbitor 24 is initialized and the conversion lookup table and maximum bandwidth value is stored in memory 46 as indicated in block 60. The network arbitor 24 receives projected rate data 48 from each of the variable rate vocoders 34 as shown in block 62. With all of the projected rate data 48 from each of the variable rate vocoders, the network arbitor 24 determines the required link bandwidth as indicated in block 64. The determined required link bandwidth is compared to the available link bandwidth value stored in memory 46 as shown in block 66. If the control processor 44 determines that the required bandwidth is exceeding the available bandwidth as shown in block 68, the control processor 44 generates the vocoder rate control signal 32 to selectively control the vocoder whose speech packet would cause the required bandwidth to exceed the available bandwidth as shown in block 70.

Figure 4:
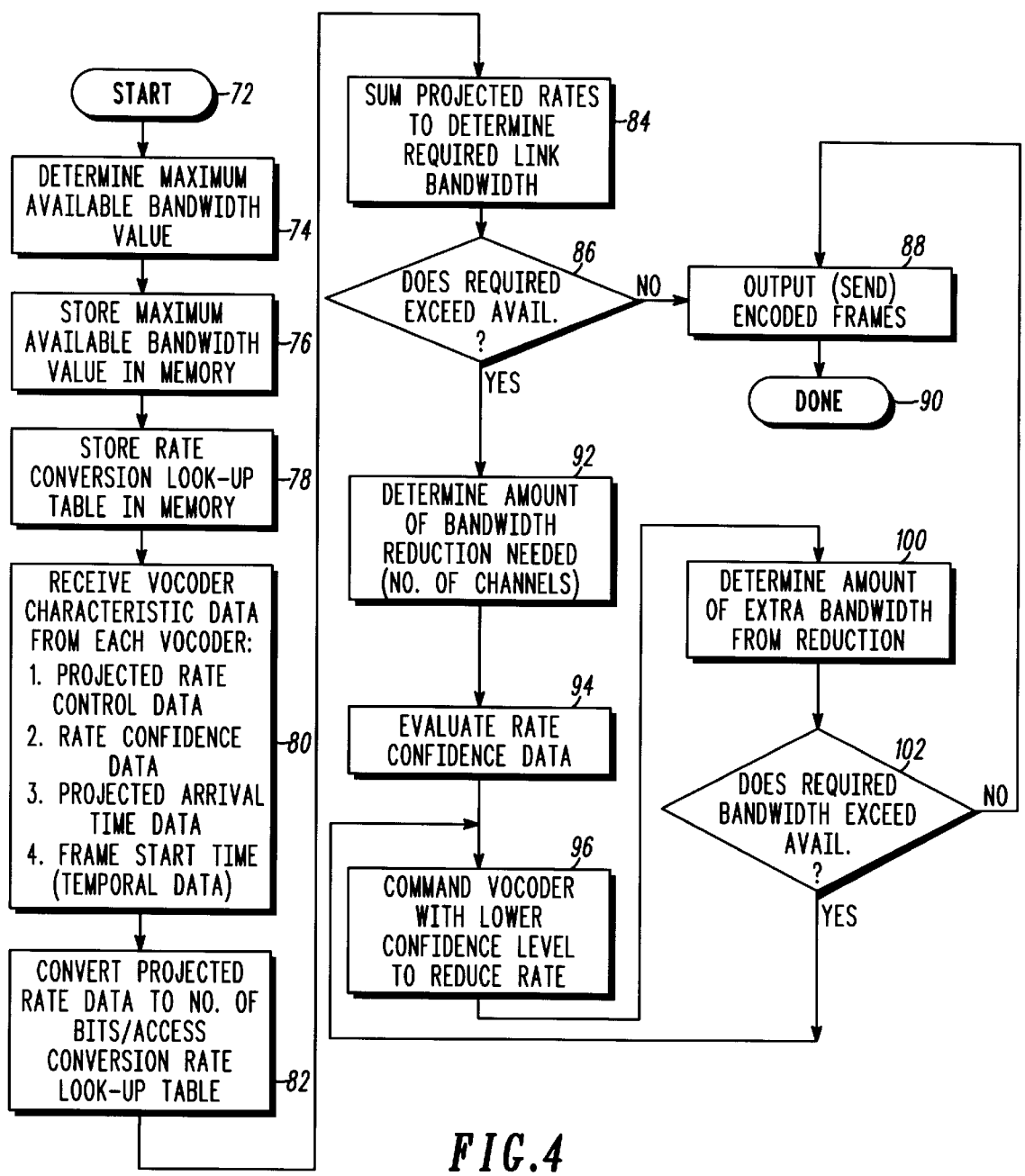
FIG. 4 is a flow diagram depicting in more detail a method for controlling an encoding rate in a communication system in accordance with one embodiment of the invention.

FIG. 4 shows in more detail an operation of the BSC 10. As indicated in block 72 the network arbitor 24 evaluates the bandwidth of link 20. The network arbitor 24 determines the maximum available bandwidth value associated with the limited bandwidth link 20 as shown in block 74. The maximum available bandwidth value is then stored in memory 46 using control processor 44 as indicated in block 76. The control processor 44 also stores the rate conversion lookup table in memory 46 as indicated in block 78. As PCM speech information is received into the speech encoder 36 and rate determinator 38 for each variable rate vocoder 34, the vocoder generates the feedforward data 30 through rate determinator 38. Rate determinator 38 generates the projected rate data 48, and/or the rate confidence level data 50, and/or the projected arrival time 52 and if necessary, the frame start time 54. The feed forward data 30 is received by the network arbitor 24 through control processor 44 as shown in block 80. The control processor 44 first converts the projected rate data 48 to a number of bits by accessing the conversion rate lookup table from memory 46 as shown in block 82. The converted rate data is summed by the control processor 44 to determine the required link bandwidth as shown in block 84 the control processor 44 then determines whether the required link bandwidth exceeds the available link bandwidth by comparing the required link bandwidth to the stored maximum bandwidth value as indicated in block 86. If the required link bandwidth is not exceeding the available bandwidth, the network arbitor transmits or outputs the encoded traffic channel packets for that time as indicated in block 88. When the encoded frames are sent, the process is complete for that frame as shown in block 90.

As shown in block 92, the control processor 44 again determines the required bandwidth and evaluates the rate confidence level data 50 as shown in block 94. Based on the rate confidence level data 50 from each of the vocoders, the control processor 44, through the vocoder rate control signal, commands the vocoder with the lower confidence level to reduce its encoding rate as indicated in block 96. If more than one vocoder must be reduced to obtain a sufficient amount of additional bandwidth, the control processor 44 sequentially commands other vocoders in the order in which the rate confidence level data dictates. Therefore, the network arbitor selectively controls the encoding rate of the vocoder with the lower rate confidence level data compared to rate confidence level data received from other of the variable rate vocoders to decrease the encoding rate of the selected vocoder.

Knowing the projected rate for a given vocoder and knowing the amount of required and available bandwidth, the control processor 44 determines the amount of extra bandwidth that results from the reduction as indicated in block 100. If the required bandwidth still exceeds the available bandwidth as indicated in block 102, the control processor 44 generates the vocoder rate control signal 32 to command the vocoder with the next lowest confidence level as indicated in block 96. If the required bandwidth does not exceed the available bandwidth then the network arbitor 24 continues to evaluate the projected rate data 48 and waits to generate a vocoder rate control signal 32 until additional bandwidth is required.

Also, when the selected vocoder receives the vocoder rate control signal 32, the selected vocoder determines how far along in the current encoding process it is. If the vocoder determines it has time to go back and re-encode at the lower rate, it performs the re-encoding operation on the current packet by recovering the filter state resulting from the previous frame. Lower rate frames typically take less time to encode. They also take less time to send and hence the frame transmission can commence later in time.

Figure 5A:
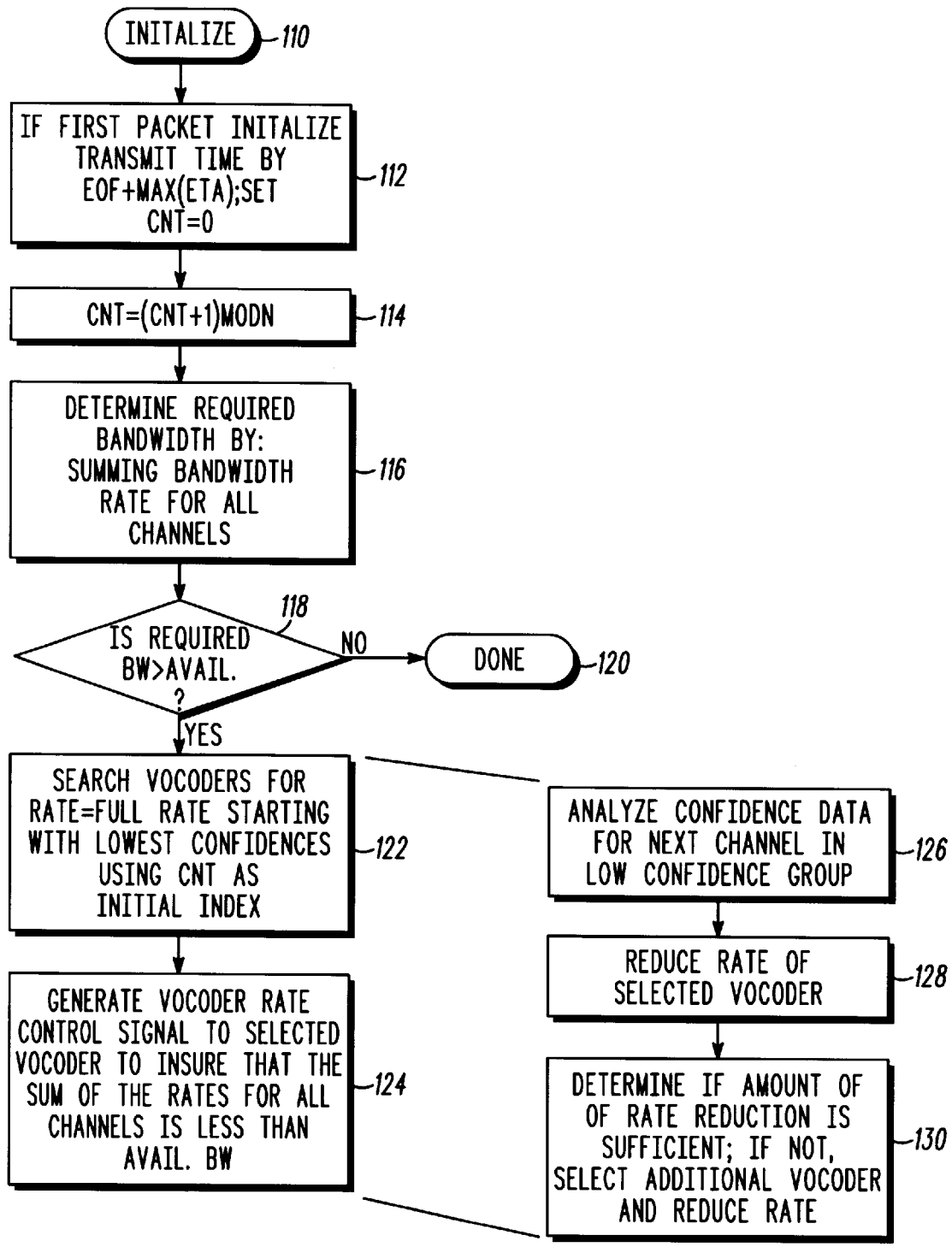
FIG. 5(a) is a flowchart generally depicting a portion of a method of controlling an encoding rate in a communication system in accordance with one embodiment of the invention.
Figure 5B:
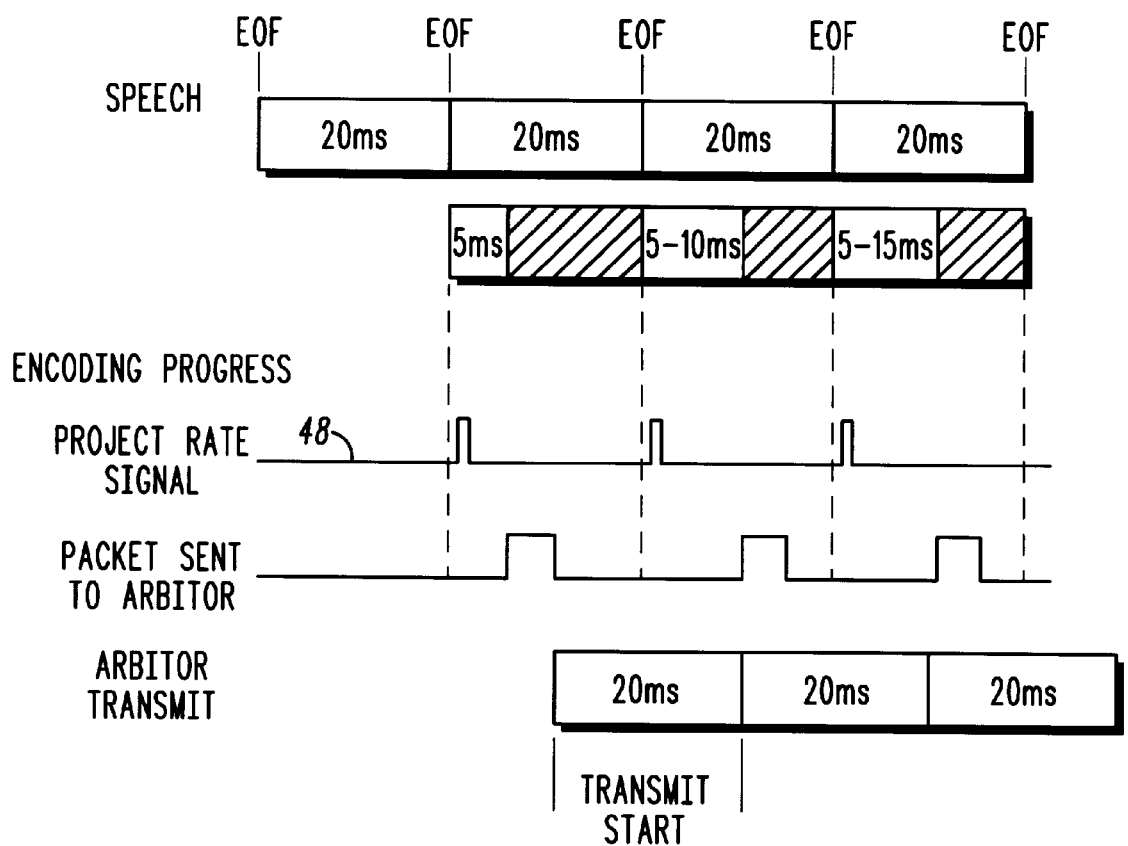
FIG. 5(b) is a diagram generally representing timing of various signals in a system for controlling an encoding rate in accordance with one embodiment of the invention.

Referring to FIGS. 5(*a*) and 5(*b*) to carry out the above process the control processor 44 initializes its counters and registers as indicated in block 110. If the control processor 44 determines that a received traffic channel packet is the first packet for a channel, the control processor 44 initializes a transmit time register by the amount of time of an end of frame to occur plus the maximum estimated time of arrival as indicated by the projected arrival time data 52. The internal counter is also set to zero. This is shown in block 112. In block 114, the control processor 44 enables the counter to continue to increment in a mod fashion to perform circular counting as known in the art. As shown in block 116 the control processor determines the required bandwidth by summing the bandwidth rates as determined by the projected rate data 48 for all channels. As shown in block 118 the control processor 44 determines if the required bandwidth is greater than the available bandwidth and does not generate a vocoder rate control signal 32 if additional bandwidth is not required as shown in block 120.

To prioritize variable rate vocoders for rate control, the network arbitor 24 through control processor 44, evaluates the projected rate data 48 to search the variable rate vocoders to determine which variable rate vocoders indicate that they require encoding at full rate. The control processor 44 also evaluates the rate confidence level data 50 and starts with the channel associated with the counter storing the lowest confidences for each sequential channel as indicated in block 122. The network arbitor 24 chooses the variable rate vocoder with the lowest confidence level at full rate as the selected variable rate vocoder. Where no variable rate vocoders are operating at full rate, the network arbitor 24 groups the variable rate vocoders in the next highest rate category, such as half rate, and chooses the half rate variable rate vocoder with the lowest confidence level as the selected variable rate vocoder.

As shown in block 124, the control processor 44 generates the vocoder rate control signal 32 for the selected variable rate vocoder to ensure that the sum of all the channels is less than the available bandwidth. Blocks 122 and 124 are further broken out into blocks 126 through 130 for clarification. As shown in block 126 when searching the variable rate vocoders for the rate information (analyzing the rate data in the projected rate data 48) the control processor 44 analyzes the confidence level data 50 for the next channel in the low confidence group previously stored from the search. The vocoder rate control signal 32 is generated for the selected variable rate vocoder based on the variable rate vocoder with the lowest confidence level out of the group as shown in block 128. If the amount of rate reduction is not sufficient to allow proper transmission of encoded data, the control processor 44 selects an additional variable rate vocoder and reduces the rate of the additional variable rate vocoder as indicated in block 130.

As shown in FIG. 5(*b*), generation and transmission of the timing for the vocoder rate control signal 32 preferably occurs prior to completion of the encoding process for the given speech packet. For example, out of a speech frame that may be twenty milliseconds long the encoding process for contained speech packets may vary between 5 to 15 milliseconds depending upon whether the encoding is at full rate, half rate, quarter rate or eighth rate. The projected rate signal 48 is generated by the variable rate vocoder shortly after the speech encoder 36 commences the encoding process. The network arbitor 24 sends the vocoder rate control signal 32 after receiving the projected rate signal 48 but prior to the completion of encoding so that the speech encoder 36 may re-encode the speech packet prior to being sent to the network arbitor 24.

As such the network arbitor 24 uses the early knowledge of the rate and expected time frame arrival as well as fixed information such as maximum allowable data holding time to predict if its going to run out of its limited bandwidth. The network arbitor commands the variable rate vocoders using the feedback vocoder rate control signal, to limit the rate of the next frame. The selected variable rate vocoder depends on the predicted arrival time of the next frame, based on the reception of the previous frame and time alignment. In addition, the network arbitor commands one or more variable rate vocoders to lower the rate of their current frame when there is sufficient time for the variable rate vocoder to re-encode the packets. The selected variable rate vocoder is based upon the level of confidence data. However, to minimize disruption to a particular voice channel commands are issued to the same variable rate vocoder in consecutive frames only when absolutely necessary.

Figure 6:
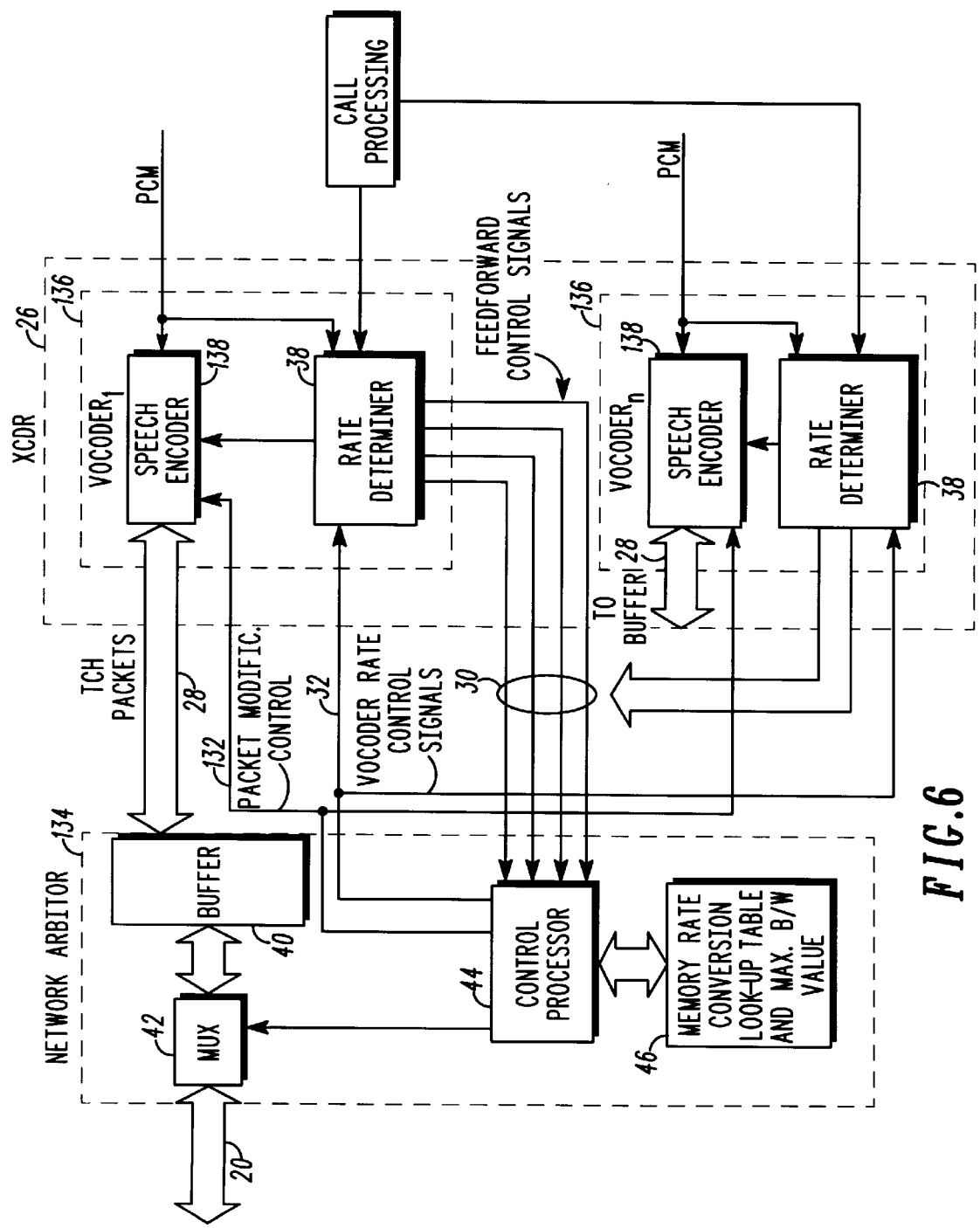
FIG. 6 is a block diagram generally depicting another embodiment of a system for controlling an encoding rate in a communication system which includes an additional network arbiter control mechanism for selectively controlling a speech encoder in accordance with another embodiment of the invention.

FIG. 6 shows yet another embodiment which is the same embodiment as shown in FIG. 2 except for the addition of a packet modification control signal 132 which is independently generated by the network arbitor 134 when there is insufficient time for the speech encoder 36 to re-encode the speech packet and the network arbitor 134 independently modifies a received speech packet from the variable rate vocoder 34. When the network arbitor 134 modifies a speech packet by discarding frames or bits, it communicates the information back to the variable rate vocoder that sent the speech packet so that the variable rate vocoder's filter states can be updated appropriately to avoid divergence between the filters of variable rate vocoder and corresponding decoder in a mobile unit. The packet modification control signal 132 indicates whether the output encoded speech output over the limited bandwidth link 20 was modified by the network arbitor 134 prior to output. Therefore the packet modification control signal 132 includes for example, channel data indicating the channel and data indicating that the packet was discarded or that the packet was rate reduced. The variable rate vocoder 136 receives the packet modification control signal 132 through speech encoder 138. The variable rate vocoder 136 then controls the speech encoder 138 to modify its filters consistent with the discarding of the information.

As with network arbitor 24 in FIG. 2, the network arbitor 134 receives rate data from the plurality of variable rate vocoders 138. The rate data may be projected rate data from feedforward data 30 or contemporaneous rate data embedded in encoded traffic channel speech packets 28. The network arbitor 134 determines the required link bandwidth for transmission of encoded packets of speech based on the rate data. The network arbitor 134 compares the required link bandwidth with an available link bandwidth obtained from memory. When ample time exists for the variable rate vocoder to reduce the encoding rate of a current speech packet, the network arbitor selectively controls the encoding rate of that variable rate vocoder in response to the comparison through vocoder rate control signal 32.

The network arbitor then outputs the encoded speech over the link. Where ample time does not exist for the selected variable rate vocoder to vary the encoding rate, the network arbitor modifies the output speech packet by discarding received speech packet information from the variable rate vocoders and/or reducing speech packet rate information by eliminating bits in the speech packet. The network arbitor then generates the packet modification control signal 132 for the selected variable rate vocoder indicating whether the output encoded speech was modified prior to output. This is done based on the modification. The network arbitor transmits the packet modification control signal to control the selected variable rate vocoder, in response to the packet modification control signal, when output encoded speech was modified.

The speech encoder 138 receives the packet modification control signal 132 and recovers a previous speech packet that was discarded and updates its filter state data for use in generating a subsequent speech packet. The speech encoder 138 may use filter update techniques such as those commensurate with IS96A, available from Electronics Industries Association/Telecommunications industries Association, Engineering Publications Office, 2001 Pennsylvania Avenue, Washington, D.C. 20006 or disclosed in U.S. Pat. No. 5,519,779 assigned to instant assignee. When the modification to the speech packet is a result of discarding a speech packet, the speech encoder 138 decays speech parameters for subsequent speech packets in response to the packet modification control signal 132.

When the speech packet modification resulted from reducing a speech packet output rate, the speech encoder 138 varies a rate of encoding for the subsequent speech packet by applying a packet reduction method to the subsequent packet. The packet reduction method may be of the type described in U.S. Pat. No. 5,519,779, entitled "Method and Apparatus for Inserting Signaling in a Communication System" and assigned to the instant assignee.

In yet another embodiment, if the selected variable rate vocoder does not have sufficient time to re-encode a current speech packet, then the variable rate vocoder continues processing at the original selected rate and then applies a rate reduction method such as that described in U.S. Pat. No. 5,519,779 incorporated herein by reference, and updates its filter states accordingly.

As seen, one embodiment of the disclosed invention facilitates a reduction in bandwidth requirement by using feedforward information of vocoder rate data to a network arbitor. The network arbitor predicts the occurrence of bandwidth bottlenecks by calculating the short-term data requirements and comparing them with the available capacity. The network arbitor also determines what action should be taken if bandwidth bottleneck is predicted. In addition, if the network arbitor discards information or otherwise modifies a packet, on a particular traffic channel, the network arbitor communicates the nature of the action to the appropriate variable rate vocoder so that the variable rate vocoder may update its filters accordingly. The system facilitates re-encoding at a lower rate than originally calculated by the rate determination algorithm.

It should be understood that the implementation of other variations and modifications of the invention in its various aspects will be apparent to those of ordinary skill in the art, and that the invention is not limited by the specific embodiments described. Although described with particular reference to a cellular CDMA radiotelephone system, the invention may be applicable to other audio related systems. Therefore the term speech packet used here includes any audio signal even if not speech. Also, the network arbitor and variable rate vocoders may be at different locations or multiplexed with other network arbitors or sets of variable rate vocoders. It is therefore contemplated to cover by the present invention, any and all modifications, variations, or equivalents that fall within the spirit and scope of the basic underlying principles disclosed and claimed herein.

What we claim is:

1. A method of controlling an encoding rate in a communication system, the method comprising the steps of:

receiving rate data from a plurality of variable rate vocoders;

determining a required link bandwidth for transmission of encoded packets of speech based on the rate data;

comparing the required link bandwidth with an available link bandwidth; and selectively controlling the encoding rate of at least one variable rate vocoder from the plurality of variable rate vocoders in response to the comparison.

2. The method of claim 1 wherein the rate data is feedforward projected rate data.

3. The method of claim 2 wherein the step of receiving includes receiving the feedforward projected rate data transmitted from the plurality of variable rate vocoders to a network arbitor and wherein the step of determining includes summing the feedforward projected rate data from the plurality of variable rate vocoders to determine the required link bandwidth.

4. The method of claim 3 wherein the step of comparing includes retrieving a stored available link bandwidth value and comparing the stored available link bandwidth value to the required link bandwidth.

5. The method of claim 1 wherein the step of selectively controlling includes generating a vocoder rate control signal for selective control of at least one variable rate vocoder to modify a rate of encoding for the at least one variable rate vocoder to facilitate reduction in link bandwidth requirement.

6. The method of claim 5 further including a step of receiving rate confidence data from at least one of the plurality of variable rate vocoders, representing a level of confidence that the rate data is indicative of a necessary variable rate vocoder rate for a given speech packet and selectively controlling at least one of the plurality of variable rate vocoders with a lower confidence level to decrease an encoding rate of a selected variable rate vocoder.

7. The method of claim 6 wherein at least one of the plurality of variable rate vocoders generates the rate confidence data and transmits the rate confidence data to a network arbitor to facilitate the reduction in link bandwidth requirement.

8. The method of claim 1 wherein at least one of the plurality of variable rate vocoders generates a projected arrival time data and transmits the projected arrival time data to a network arbitor to facilitate a reduction in link bandwidth requirement.

9. The method of claim 1 wherein at least one of the plurality of variable rate vocoders generates a signaling packet data and transmits the signaling packet data to a network arbitor to facilitate a reduction in link bandwidth requirement.

10. The method of claim 3 wherein the network arbitor receives the feedforward projected rate data for a speech packet from at least one of the plurality of variable rate vocoders prior to the at least one variable rate vocoder completing encoding of the speech packet.

11. The method of claim 5 wherein a network arbitor generates the vocoder rate control signal to facilitate selective control of the at least one variable rate vocoder prior to the at least one variable rate vocoder completing encoding of a current packet, the current packet being encoded while the required link bandwidth is being determined at the determining step, to vary an encoding rate of the current packet.

12. The method of claim 5 wherein a network arbitor generates the vocoder rate control signal to facilitate selective control of the at least one variable rate vocoder after the at least one variable rate vocoder has completed encoding of a packet, the packet being encoded while the required link bandwidth is being determined at the determining step to vary an encoding rate of a subsequent packet to the packet.

13. The method of claim 12 wherein the at least one variable rate vocoder, in response to the vocoder rate control signal, analyzes a current state of encoding to determine whether re-encoding at a lower encoding rate for a current packet, the current packet being encoded while the required link bandwidth is being determined at the determining step, may be suitably accomplished.

14. A method of controlling an encoding rate in a communication system, the method comprising the steps of:

receiving rate data from a plurality of variable rate vocoders by transmitting a rate control signal to a network arbitor;

receiving rate confidence data from at least one of the plurality of variable rate vocoders, representing a level of confidence that the rate data is indicative of a necessary variable rate vocoder rate for a given speech packet;

determining a required link bandwidth for transmission of encoded packets of speech based on the rate data by summing rate data from the plurality of variable rate vocoders to determine the required link bandwidth;

comparing the required link bandwidth with an available link bandwidth; and selectively controlling the encoding rate of at least one variable rate vocoder with lower rate confidence level data compared to rate confidence level data received from other of the plurality of variable rate vocoders to decrease the encoding rate of the selected variable rate vocoder, by generating a vocoder rate control signal to modify a rate of encoding for the at least one variable rate vocoder to facilitate a reduction in bandwidth requirement for the link, and wherein the network arbitor generates the vocoder rate control signal to facilitate selective control of the at least one variable rate vocoder prior to the at least one variable rate vocoder completing encoding of a current packet, the current packet being encoded while the required link bandwidth is being determined at the determining step, to vary the encoding rate of the current packet.

15. The method of claim 14 wherein the rate data is feedforward projected rate data.

16. The method of claim 11 wherein the network arbitor generates the vocoder rate control signal to facilitate selective control of the at least one variable rate vocoder after the at least one variable rate vocoder has completed encoding of a packet, the packet being encoded while the required link bandwidth is being determined at the determining step, to vary an encoding rate of a subsequent packet to the packet.

17. The method of claim 16 wherein the at least one variable rate vocoder, in response to the vocoder rate control signal, analyzes a current state of encoding to determine whether re-encoding at a lower encoding rate for a current packet, the current packet being encoded while the required link bandwidth is being determined at the determining step may, be suitably accomplished.

18. A system for controlling an encoding rate in a communication system comprising:

means for receiving rate data from a plurality of variable rate vocoders;

means for determining a required link bandwidth for transmission of encoded packets of speech based on the rate data;

means for comparing the required link bandwidth with an available link bandwidth; and means, response to the comparison, for selectively controlling the encoding rate of at least one variable rate vocoder from the plurality of variable rate vocoders to facilitate a reduction in required link bandwidth.

19. The system of claim 18 wherein the rate data is feedforward projected rate data.

20. The system of claim 18 wherein the means for receiving is section of a network arbitor and the plurality of variable rate vocoders transmits projected rate data to the network arbitor and wherein means for determining includes means for summing rate data from the plurality of variable rate vocoders to determine the required link bandwidth.

21. The system of claim 18 wherein the means for selectively controlling includes means for generating a vocoder rate control signal for selective control of the at least one variable rate vocoded to modify rate of encoding for the at least one variable rate vocoder to facilitate a reduction in band width requirement for the link.

22. A system for controlling an encoding rate in a communication system comprising:

a network arbitor having, means for receiving projected rate data from a plurality of variable rate vocoders by transmitting projected rate data to a network arbitor;

means for receiving rate confidence level data from at least one of the plurality of variable rate vocoders, representing a level of confidence that the projected rate data is indicative of a necessary variable rate vocoder rate for a given speech packet;

means for determining a required link bandwidth for transmission of encoded packets of speech based on the projected rate data by summing projected rate data from the plurality of variable rate vocoders to determine the required link bandwidth;

means for comparing the required link bandwidth with an available link bandwidth; and means, responsive to a vocoder rate control signal, for selectively controlling the encoding rate of at least one variable rate vocoder having lower rate confidence level data compared to rate confidence level data received from other of the plurality of variable rate vocoders, to decrease an encoding rate of a selected variable rate vocoder to facilitate a reduction in bandwidth requirement for the link, and wherein the network arbitor generates the vocoder rate control signal to facilitate selective control of the at least one variable rate vocoder prior to the at least one variable rate vocoder completing encoding of a current packet, the current packet being encoded while the means for determining is determining the required link bandwidth, to vary an encoding rate of the current packet.

23. The system of claim 22 wherein the network arbitor generates the vocoder rate control signal to facilitate selective control of the at least one variable rate vocoder after the at least one variable rate vocoder has completed encoding of a packet to vary an encoding rate of a subsequent packet.

24. The system of claim 23 wherein the at least one variable rate vocoder, in response to the vocoder rate control signal, analyzes a current state of encoding to determine whether re-encoding at a lower encoding rate for the current packet may be suitably accomplished.

25. A method of controlling an encoding rate in a communication system, the method comprising the steps of:

receiving rate data from a plurality of variable rate vocoders;

determining a required link bandwidth for transmission of encoded packets of speech based on the rate data;

comparing the required link bandwidth with an available link bandwidth;

selectively controlling the encoding rate of at least one variable rate vocoder from the plurality of variable rate vocoders in response to the comparison;

outputting encoded speech over the link;

generating a packet modification control signal for a selected variable rate vocoder indicating whether the output encoded speech was modified prior to output; and controlling the selected variable rate vocoder, in response to the packet modification control signal, when output encoded speech was modified.

26. The method of claim 25 wherein the step of generating the packet modification control signal is based on a modification resulting from discarding speech packet information and/or reducing speech packet rate information.

27. The method of claim 26 wherein the step of controlling the selected variable rate vocoder includes recovering a previous speech packet that was discarded and updating filter state data for a subsequent speech packet.

28. The method of claim 27 wherein the step of controlling includes facilitating decaying of speech parameters for use in generating subsequent speech packets, in response to the packet modification control signal, when the modification resulted from discarding speech encoded information.

29. The method of claim 27 wherein the step of controlling includes varying a rate of encoding for use in generating the subsequent speech packet, in response to the packet modification control signal, when the modification resulted from reducing a speech packet output rate.

30. The method of claim 28 wherein the communication system is a CDMA system and a network arbiter generates the packet modification control signal for the selected variable rate vocoder indicating whether the output encoded speech was modified prior to output.

31. The method of claim 26 wherein the step of receiving includes receiving projected rate data transmitted from the variable rate vocoder to a network arbitor and wherein the step of determining includes summing projected rate data from the plurality of variable rate vocoders to determine the required link bandwidth.

32. The method of claim 26 wherein the step of selectively controlling includes generating a vocoder rate control signal for selective control of the at least one variable rate vocoder to modify a rate of encoding for the at least one variable rate vocoder to facilitate a reduction in link bandwidth requirement.

* * * * *

UNITED STATES PATENT AND TRADEMARK OFFICE
CERTIFICATE OF CORRECTION

PATENT NO. : 5,898,696
DATED : April 27, 1999
INVENTOR(S) : Lee Michael Proctor; James Patrick Ashley It is certified that error appears in the above-identified patent and that said Letters Patent is hereby corrected as shown below:

Column 13, Line 10 reads "vocoded" should be --vocoder--

Column 13, Line 10 reads "modify rate" should be --modify a rate--

Signed and Sealed this

Ninth Day of November, 1999

Q. TODD DICKINSON

Attest:

Attesting Officer

Acting Commissioner of Patents and Trademarks